Jan. 12, 1965     R. L. GAULT ETAL     3,165,627
COOKING RANGE REVOLVING PLATFORM

Filed May 24, 1963     3 Sheets-Sheet 1

INVENTORS
Robert L. Gault and
David L. Haas.
BY
*Francis E. Blake*
ATTORNEY

United States Patent Office 3,165,627
Patented Jan. 12, 1965

3,165,627
COOKING RANGE REVOLVING PLATFORM
Robert L. Gault, Mansfield, Ohio, and David L. Haas, Alexandria, Va., assignors to Westinghouse Electric Corporation, East Pittsburgh, Pa., a corporation of Pennsylvania
Filed May 24, 1963, Ser. No. 283,055
7 Claims. (Cl. 219—444)

This invention relates to cooking ranges and more particularly to the platform arrangement for supporting one or more cooking heating elements on the range cabinet structure.

A desirable feature of modern home kitchen design is the provision of large amounts of counter and shelf space. Cooking ranges having their cooking elements mounted on a platform slidable from beneath an overlying shelf or table are known and have been used in alignment with built-in kitchen cabinets to increase the available counter space.

It is a principal object of the present invention to provide an improved and simplified movable platform arrangement for supporting cooking range heating elements.

Another object of the invention is to provide a cooking range with an improved rotatable heating element platform that may be rotated to various positions to expose selected ones of the heating units while retaining the other heating units in a concealed position beneath a shelf or cover thus providing additional shelf and counter space.

In accordance with the invention, the cooking range is provided with a top surface rotatable platform generally circular in shape but having a truncated peripheral portion. The platform is rotatably secured to the supporting cabinet structure in a position whereby the truncated peripheral portion of the platform may be aligned with the front wall surface of the cabinet in a selected rotatable position and certain of the heating units of the cabinet are, for the same platform position, concealed beneath an overlying cover or shelf. Upon rotating the platform approximately one hundred and eighty degrees from the above described selected position, all of the heating units including those previously positioned beneath the overlying shelf are moved into an exposed operating position. Commutating switch means may be provided to energize only those heating units that are exposed by a given selected rotatable position of the platform.

Further objects, features and the attendant advantages of the invention will be apparent with reference to the following specification and drawings, in which.

Figure 1:
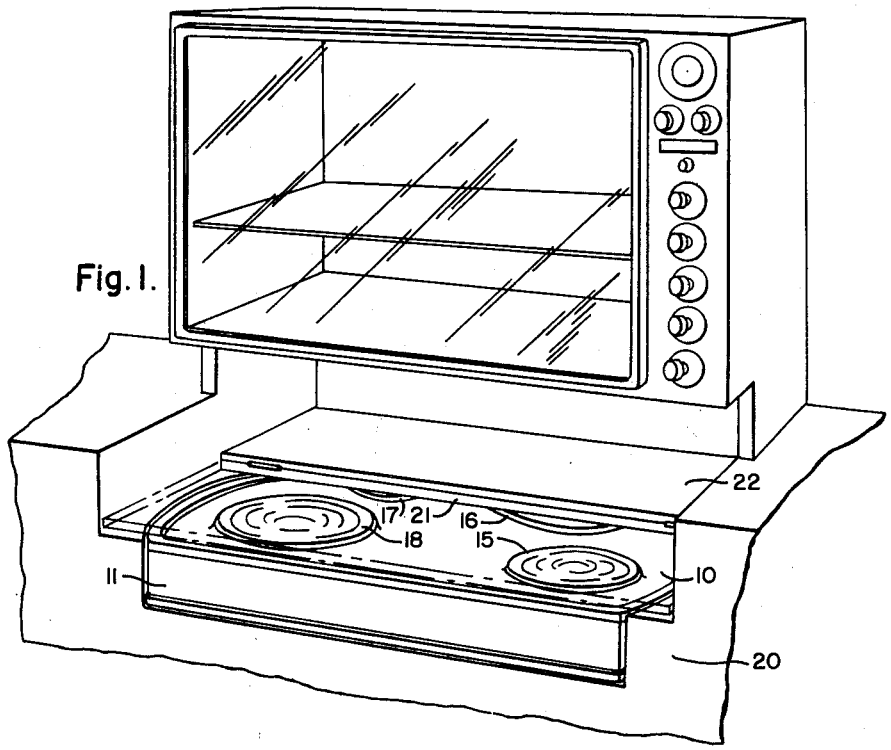
FIGURE 1 is a fragmentary elevational view of the cooking range platform of the invention in a first selected rotatable position.

Referring now to FIGS. 1-4 of the drawings, it will be seen that a rotatable heating element supporting platform for a cooking range is generally shown at 10. The rotatable platform 10 is generally circular in shape but is provided with a truncated peripheral portion 11. As most clearly shown by FIG. 3 of the drawings, the rotatable platform 10 is pivotally secured to the range cabinet structure generally shown at 12 by means of a rotating collar arrangement 13. The collar arrangement 13 is preferably hollow in order that the plurality of energy conveying conduits such as the conduit 14 may be passed up there-through to the various ones of the heating units or elements 15-18. Obviously the rotatable collar 13 may take various forms the details of which are not necessary to an understanding of the present invention. However, it will be noted that, in accordance with the invention, the pivot point for the rotatable collar 13 is offset from the diametrical center of the rotatable range platform 10 so that the platform is thereby positioned on the supporting cabinet structure 12 such that when the platform is in one selected rotatable position such as the position shown by FIG. 1 of the drawings, the truncated platform peripheral portion 11 will be in alignment with the front surface 20 of the supporting cabinet structure 12. Also, while the range platform 10 is in the selected rotatable position shown by FIG. 1 of the drawings only the heating units 18 and 15 will be exposed from beneath the overlying shelf or cabinet structure 21. It may be preferable to provide that at least one of the heating units 15 or 18 be of the high power fast heating type so that the cooking range may be more effectively used with the platform in the most compact position as shown by FIG. 1 of the drawings.

Figure 2:
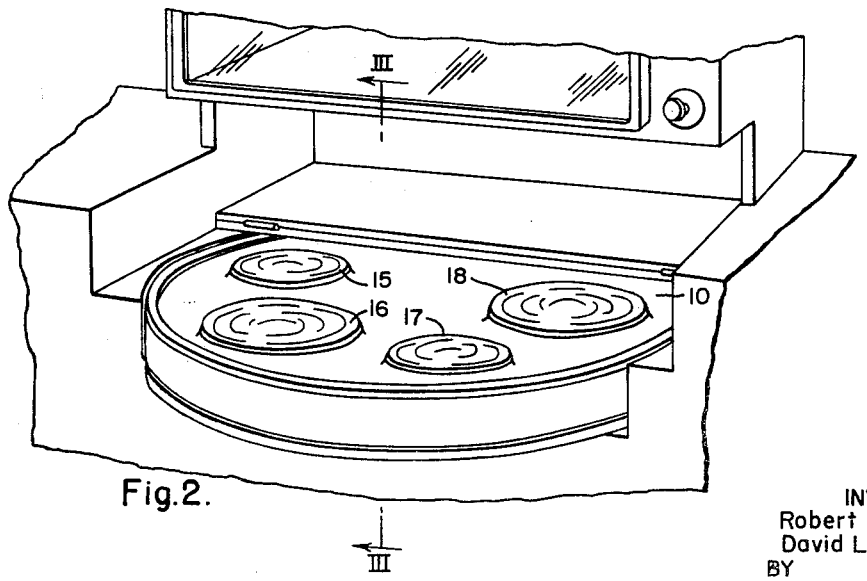
FIG. 2 is a view similar to FIG. 1 but showing the rotatable cooking range element supporting platform in another selected rotatable position approximately one hundred and eighty degrees from the position shown by FIG. 1 of the drawings.
Figure 3:
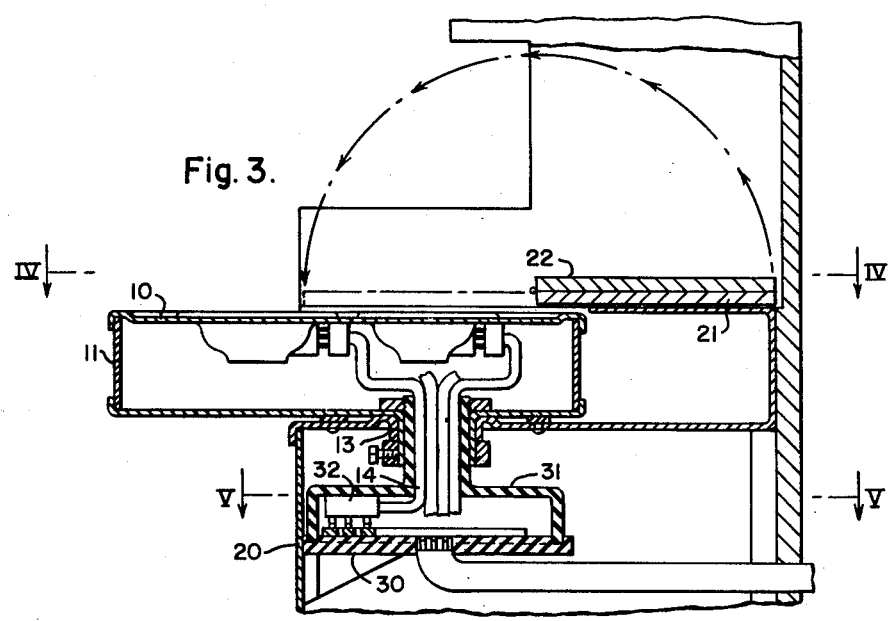
FIG. 3 is a fragmentary section on the line III—III of FIG. 2.
Figure 4:
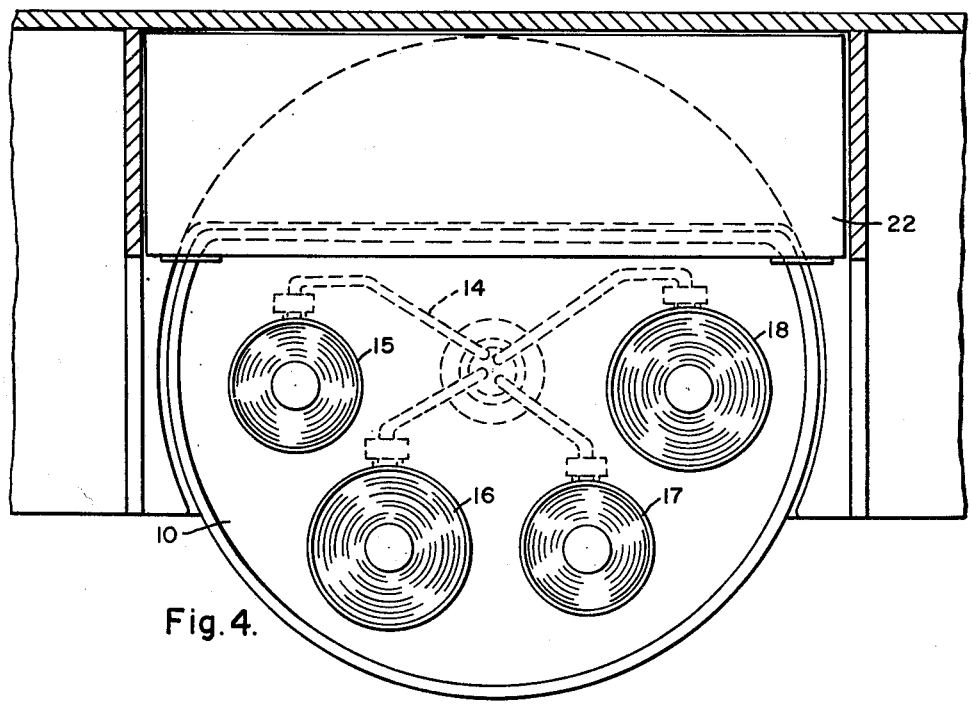
FIG. 4 is a sectional view as seen in the direction of the arrows on the line IV—IV of FIG. 3.

Simply by rotating the platform 11 to the position shown by FIGS. 2, 3 and 4 of the drawings all of the heating units 15-18 will be exposed from beneath the overlying platform 21 and will thereby be available for convenient use. It will be noted that the overlying platform 21 may be provided with a pivoted top shelf 22 which may be moved from the solid line position shown in FIG. 3 of the drawings to the dotted line position thus overlying all of the range heating units when the platform 11 is in the rotatable position shown by FIG. 1 of the drawings. In such manner even more counter space is available when the cooking range is not being used for heating purposes. In place of the pivotal shelf 22, a sliding shelf arrangement may be used (not shown) and in similar manner other forms of movable shelf arrangements may be used as will be obvious to those skilled in the art.

Figure 5:
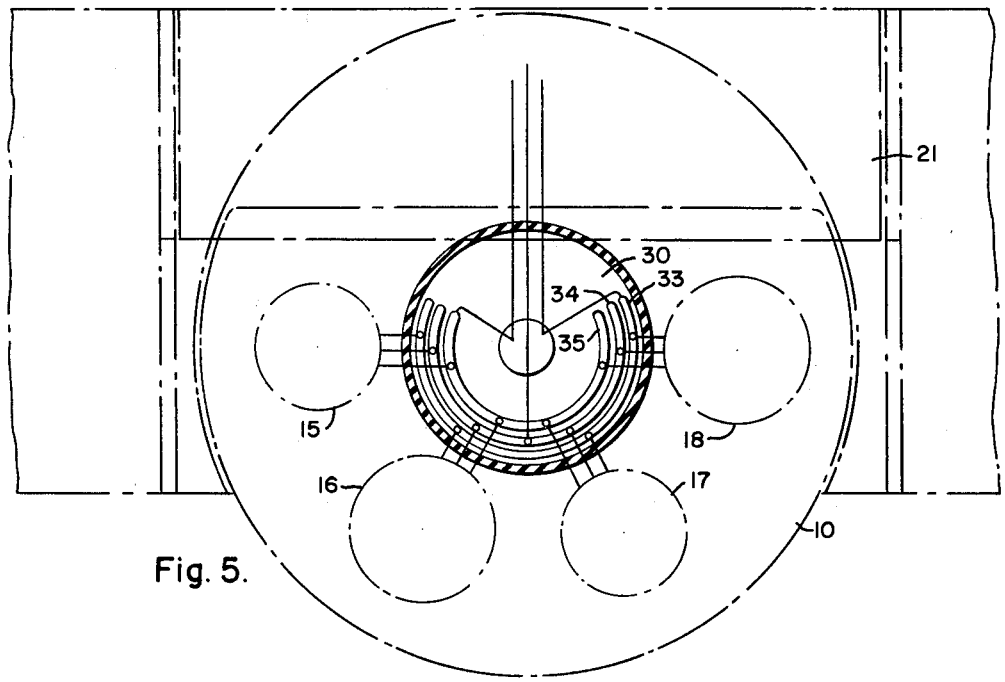
FIG. 5 is a section in the direction of the arrows on the line V—V of FIG. 3.
Figure 6:
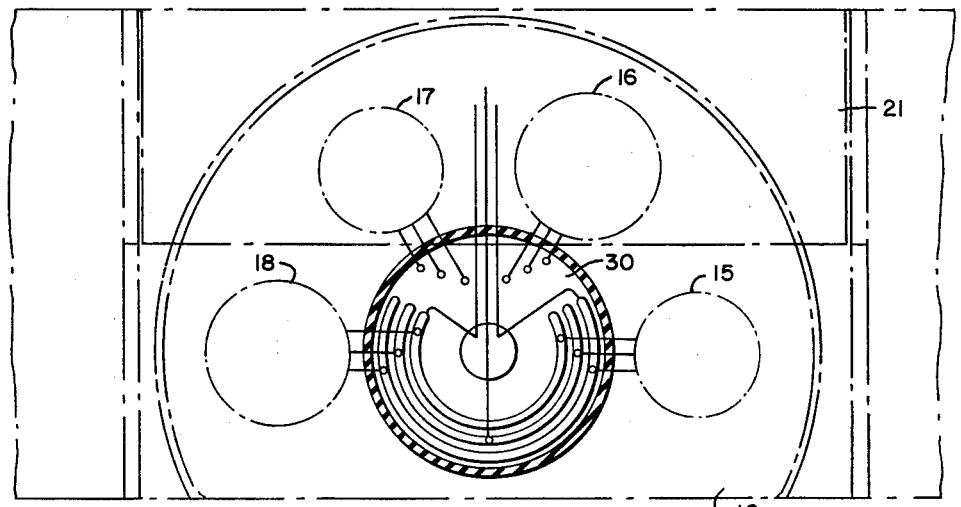
FIG. 6 is a view similar to FIG. 5 but with the range platform again rotated to the position shown by FIG. 1 of the drawings.

Referring now to FIGS. 3, 4 and 6 of the drawings, a commutating switch arrangement for supplying electrical energy to only those heating units that are exposed from beneath the overlying cabinet shelf 21 will be described. A stationary commutator segment support 30 of insulating material is secured in any suitable manner to the supporting cabinet structure 12. A rotatable commutator brush supporting element 31 is supported within the rotatable collar 13 and is secured to the structure of the rotatable platform 11 to be rotated therewith. A brush assembly 32 preferably supporting three commutator brushes for use with a conventional three wire 220 volt system is fixed to the rotatable commutator member 31 for rotation therewith as the cooking range platform 11 is rotated. It will be seen that each of the commutator segments 33, 34 and 35 as shown by FIGS. 5 and 6 of the drawings are so shaped and positioned that when the rotatable platform 10 is in various rotatable positions, various ones of the associated commutator brush supporting elements such as the element 32 may be out of contact with the commutator segments 33, 34 and 35 so that, for the platform position shown by FIG. 6, no energy will be supplied to the heating units 16 and 17. Upon rotating the platform 10 to the position shown by FIG. 5 of the drawings all of the commutator brush supporting elements individually associated with the respective heating elements 15–18 will have their brushes in engagement with the commutator segments 33, 34 and 35 thus supplying energy to all of the exposed heating units 15–18. It should be understood of course that individual heating unit switch control elements (not shown) would be interposed in the connection between the commutator brush elements such as the element 32 and the associated heating units such as the heating unit 15 connected thereto by the wire conduit 14. It is believed that the connection and arrangement of the individual switch control devices for the respective heating elements 15–18 will be a matter of design choice that is obvious to one skilled in the art and therefore in the interest of simplifying the drawings such switch elements have not been shown. It should also be understood that the revolvable platform arrangement of the invention and the associated shelf and cabinet structure may also be used with other types of heating units such as a gas heating unit in which case the commutating energy arrangement would employ suitable manifolding and valves in place of the electrical commutating switch arrangement described above.

Various modifications will occur to those skilled in the art.

We claim as our invention:

1. A cooking range comprising, a supporting cabinet structure having a front wall, a rotatable range element platform having a generally circular configuration with a truncated peripheral portion, means rotatably securing said platform to said cabinet structure as a top surface thereof in a location such that said truncated portion is aligned with said front wall surface when said rotatable platform is in a first selected rotatable position, a cabinet structure overlying in vertically spaced relation a portion of said platform, and a plurality of range heating elements mounted on said platform to be carried thereby to advance selected ones of said elements to a position nearer said front wall when said platform is rotated.

2. A cooking range comprising, a supporting cabinet structure having a front wall surface, a rotatable range element platform having a generally circular configuration with a truncated peripheral portion, means rotatably securing said platform to said cabinet structure as a top surface thereof in a position such that said truncated portion is aligned with said front wall surface when said rotatable platform is in a first selected position, a shelf member carried by said cabinet structure in a position to overlie a rear portion of said platform when said platform is in the first selected position, and a plurality of range heating elements mounted on said platform to be carried thereby to expose at least one of said elements from beneath said shelf member when said platform is rotated.

3. A cooking range comprising, a supporting cabinet structure having a front wall, a rotatable range element platform having a generally circular configuration with a truncated peripheral portion, means rotatably securing said platform to said cabinet structure as a top surface thereof in a location such that said truncated portion is aligned with said front wall surface when said rotatable platform is in a first selected rotatable position, and a plurality of range heating elements including at least one high powered heating element mounted on said platform in location to be carried thereby to position at least one high powered element near said front wall when said platform is in the first selected position.

4. A cooking range comprising, a supporting cabinet structure having a front wall, a rotatable range element platform having a generally circular configuration with a truncated peripheral portion, means rotatably securing said platform to said cabinet structure as a top surface thereof in a location such that said truncated portion is aligned with said front wall surface when said rotatable platform is in a first selected rotatable position, a shelf member carried by said cabinet structure in a position to overlie a rear portion of said platform when said platform is in the first selected position, and a plurality of range heating elements including at least one high powered heating element mounted on said platform in locations to be carried thereby to expose at least one high powered element from beneath said shelf member when said platform is in the first selected position.

5. A cooking range comprising, a supporting cabinet structure having a front wall, a rotatable range element platform having a generally circular configuration with a truncated peripheral portion, means rotatably securing said platform to said cabinet structure as a top surface thereof in a location such that said truncated portion is aligned with said front wall surface when said rotatable platform is in a first selected rotatable position, a shelf member carried by said cabinet structure in a position to overlie a rear portion of said platform when said platform is in the first selected position, and a plurality of range heating elements including at least one high powered heating element mounted on said platform in locations to be carried thereby to expose at least one high powered element from beneath said shelf member when said platform is in the first selected position and expose all of said elements from beneath said shelf member when said platform is in another rotatable position.

6. A cooking range comprising, a supporting cabinet structure having a front wall, a rotatable range element platform having a generally circular configuration with a truncated peripheral portion, means rotatably securing said platform to said cabinet structure as a top surface thereof in a location such that said truncated portion is aligned with said front wall surface when said rotatable platform is in a first selected rotatable position, a plurality of range heating elements mounted on said platform to be carried thereby, a first shelf member carried by said cabinet structure in a position to overlie a rear portion of said platform when said platform is in the first selected position, and a movable shelf element carried by said platform in a normal position in substantial alignment with said first shelf member and movable to a position overlying the front portion of said platform when said platform is in the first selected position.

7. A cooking range comprising, a supporting cabinet structure having a front wall, a rotatable range element platform having a generally circular configuration with a truncated peripheral portion, means rotatably securing said platform to said cabinet structure as a top surface thereof in a location such that said truncated portion is aligned with said front wall surface when said rotatable platform is in a first selected rotatable position, a plurality of range heating elements mounted on said platform to be carried thereby, a first shelf member carried by said cabinet structure in a position to overlie a rear portion of said platform when said platform is in the first selected position, and a second shelf member pivotally secured to said first shelf member to overlie said first member in one position and to be movable to another position overlying the front portion of said platform when said platform is in the first selected position.

References Cited in the file of this patent

UNITED STATES PATENTS

| | | |
|---|---|---|
| 1,603,127 | Lombardo | Oct. 12, 1926 |
| 2,526,476 | Ham | Oct. 17, 1950 |
| 2,685,635 | Neumann | Aug. 3, 1954 |
| 3,101,227 | Pugh | Aug. 20, 1963 |

FOREIGN PATENTS

| | | |
|---|---|---|
| 111,100 | Germany | June 11, 1900 |